Figure 1:
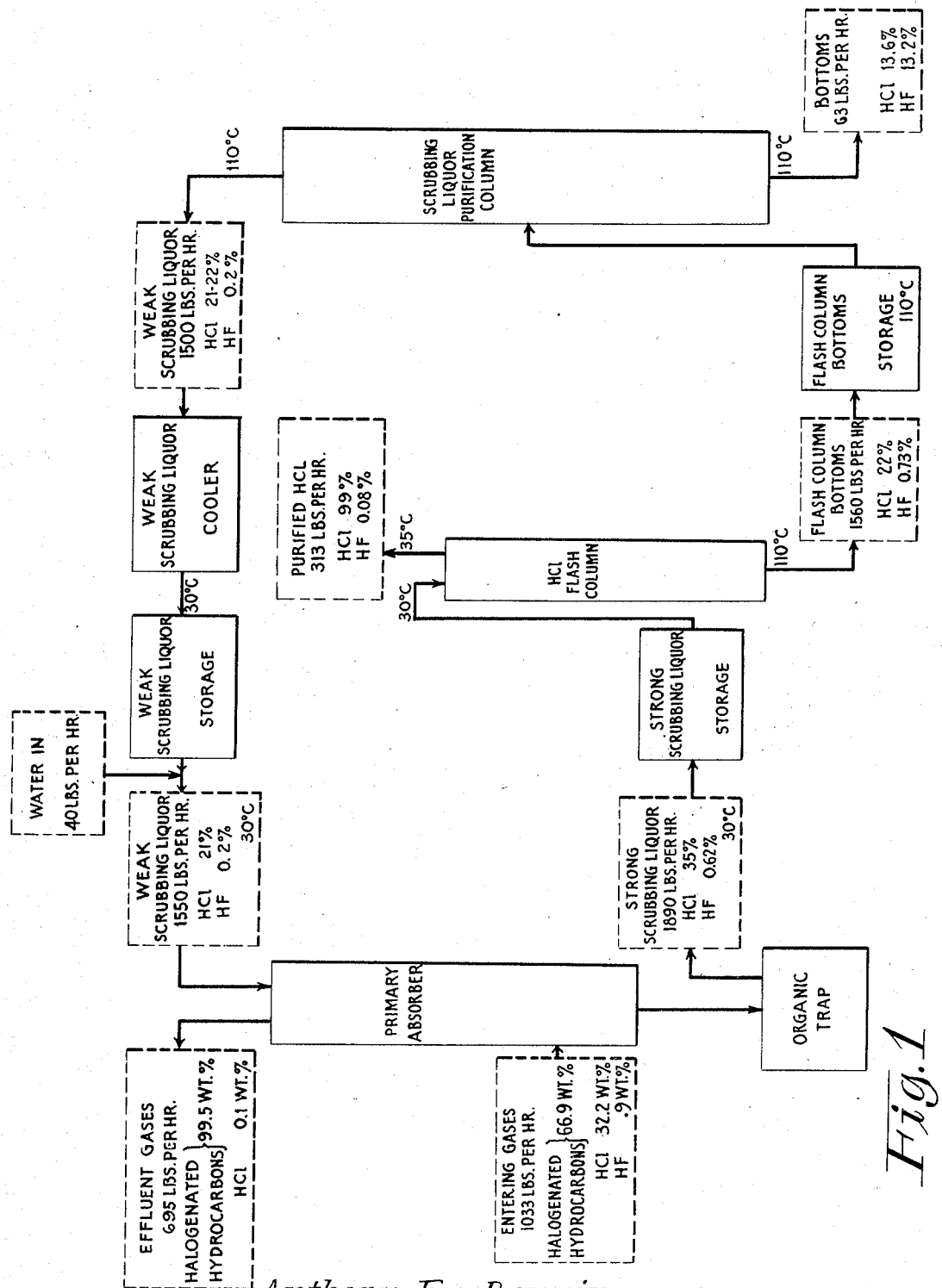

Anthony F. Benning
Frederick B. Downing
Roy J. Plunket
INVENTORS

BY Edwin C. Woodhouse ATTORNEY

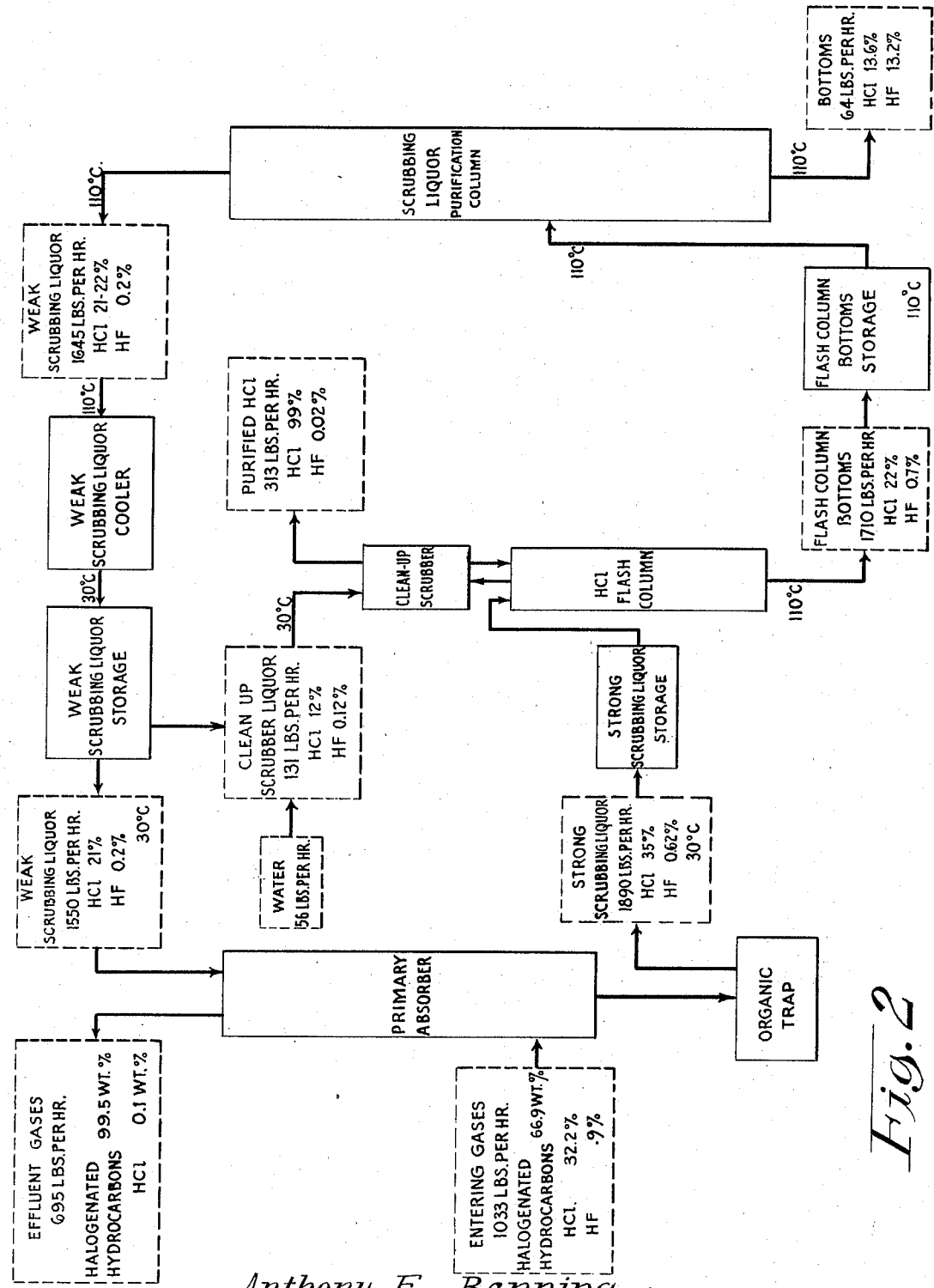

Patented Apr. 4, 1944

2,345,696

UNITED STATES PATENT OFFICE 2,345,696

PURIFICATION OF HYDROCHLORIC ACID

Anthony F. Benning, Woodstown, Frederick B. Downing, Penns Grove, N. J., and Roy J. Plunkett, Wilmington, Del., assignors to Kinetic Chemicals, Inc., Wilmington, Del., a corporation of Delaware Application April 5, 1939, Serial No. 266,070

10 Claims. (Cl. 23—154)

This invention relates to the separation of mixtures of hydrochloric acid and hydrofluoric acid, and particularly to the purification of hydrochloric acid containing a relatively small proportion of hydrofluoric acid as an impurity.

Mixtures of hydrochloric acid and hydrofluoric acid are frequently obtained in some chemical processes such as in the halogenation of hydrocarbons. Such mixtures may be obtained in the form of gaseous mixtures or in aqueous solution. Such mixtures usually have little or no utility. On the other hand, each acid, if it could be successfully separated from the mixture, would be valuable for many purposes. However, no economically feasible method has been known for separating these acids sufficiently to produce acids which would be commercially valuable.

We have now discovered a simple and economical method of separating mixtures of hydrochloric acid and hydrofluoric acid, which method forms the subject matter of our invention which will be described hereinafter in connection with the accompanying drawings, in which Figure 1 illustrates schematically one method of practicing the invention and the apparatus employed therein, and Figure 2 illustrates a modification of the process of Figure 1.

It is an object of the present invention to provide a method for the separation of hydrochloric acid and hydrofluoric acid from mixtures of the two, and particularly from gaseous mixtures containing both acids. Another object is to provide a method for purifying hydrochloric acid containing relatively small proportions of hydrofluoric acid. A further object is to provide a method for obtaining substantially anhydrous hydrochloric acid essentially free from hydrofluoric acid from mixtures of hydrochloric and hydrofluoric acids. Other objects are to advance the art. Still other objects will appear hereinafter.

The above objects may be accomplished in accordance with our invention which comprises fractionally distilling aqueous solutions of mixtures of hydrochloric acid and hydrofluoric acid. If the mixture of hydrochloric acid and hydrofluoric acid is obtained as a gaseous mixture, then the gases will first be absorbed in an inert aqueous solvent such as water and solutions of the acids in water.

Our invention is based upon the discovery that a gaseous mixture of hydrochloric acid and hydrofluoric acid, in equilibrium with an aqueous solution of the two acids, contains a disproportionately low percentage of hydrofluoric acid when compared with the solution with which it is in equilibrium. For example, a solution containing 22% hydrochloric acid for 5% hydrofluoric acid (a ratio of 4.4 to 1) is in equilibrium with a gaseous phase containing 38% hydrochloric and 3% hydrofluoric acid (a ratio of 12.6 to 1). Accordingly, when an aqueous solution of the mixture of acids is fractionally distilled, the vapors leaving the solution will contain a smaller proportion of hydrofluoric acid than the solution from which it is evolved. Our invention takes advantage of this novel discovery.

Usually, the mixture of acids will be obtained in the gaseous state, and frequently admixed with water insoluble gases. In accordance with our invention, such gaseous mixtures are absorbed in water and the resulting solution is fractionally distilled to obtain fractions of different concentrations of the acids. The resulting fractions can then be redistilled or refractionated any desired number of times until fractions are obtained having the constitution desired. Usually, such refractionation and redistillations may be continued until a still residue having a concentration of about 30% hydrofluoric acid is obtained, after which further fractionation of the still residue is generally not economically feasible. Such still residue, however, is valuable for many uses. Even less concentrated solutions, containing from about 13% to 30% hydrofluoric acid, are valuable for some purposes.

It is well known that, when aqueous solutions containing over 20% of hydrochloric acid are heated, anhydrous hydrochloric acid will be driven off until the concentration is lowered to about 20% hydrochloric acid. We have found that even relatively large amounts of hydrofluoric acid in such a solution do not materially affect such process. In other words, if a solution, containing more than 20% of hydrochloric acid and from a few tenths to several percent of hydrofluoric acid, is heated in the usual manner to obtain anhydrous hydrochloric acid, such anhydrous hydrochloric acid will be obtained with only a relatively small proportion of hydrofluoric acid. Therefore, it is particularly desirable to absorb the hydrochloric and hydrofluoric acids in water until concentrated solutions are obtained, and preferably concentrations of at least 25% of hydrochloric acid. Such highly concentrated solutions are most readily obtained by absorbing the gases in water containing from about 20 to about 22% of hydrochloric acid. However, less concentrated solutions may be employed successfully as the absorbing liquid.

The gases may be absorbed on the countercurrent flow principle. In other words, the gases may be caused to flow countercurrently with water whereby the gases become progressively poorer in the acids and the water becomes progressively richer in the acids. For example, in such a system, pure water may be flowing in at one end and gases, free of hydrochloric acid and hydrofluoric acid, will be exiting from such end, and a concentrated solution of the acids will be flowing from the other end of the system and gases rich in the acids will be flowing in at such end.

We have further found that, when a mixture of the gases are brought into contact with a concentrated solution containing from about 32 to about 37% hydrochloric acid, the hydrofluoric acid will be preferentially absorbed in the solution and, if the period of contact is sufficiently long, essentially all of the hydrofluoric acid may be removed from the gases, which gases will then be substantially free of hydrofluoric acid. The removal of the hydrofluoric acid from the gases can be made substantially as complete as desired, particularly by continually contacting the gases with fresh concentrated hydrochloric acid solution substantially free of hydrofluoric acid. The thus purified gases can then be employed for making solutions of hydrochloric acid substantially free of hydrofluoric acid and which will not require further distillation to produce solutions of valuable commercial utility.

The feature of selective absorption of hydrofluoric acid from gaseous mixtures of the same can be further taken advantage of for the further purification of anhydrous hydrochloric acid obtained from concentrated solutions of mixtures of hydrochloric and hydrofluoric acid.

In many commercial operations, it is not necessary to have hydrochloric acid completely free of hydrofluoric acid, but the hydrochloric acid may contain up to about .1% of hydrofluoric acid. Accordingly, only a few redistillations or refractionations will be necessary to produce commercially valuable products and such products may be obtained in a continuous manner from a continuous process.

If a solution having a certain concentration of acids is distilled, the distillate will have a different constitution. So long as the composition of the solution remains constant, the composition of the distillate will also remain constant. In batch distillations, the composition of the solution will continually change to become progressively richer in hydrofluoric acid and the composition of the distillate will also change toward a higher hydrofluoric acid content. However, in a continuous process, the composition of the solution can be maintained substantially constant and there will thereby be produced a distillate of substantially constant composition. The composition of the solution may be maintained constant by the addition of hydrochloric acid, hydrofluoric acid and water in substantially the same proportions in which they are removed.

The apparatus which may be employed in practicing our invention may be of quite varied nature. In batch operations, the gases may be absorbed in the aqueous solvent in any suitable vessel made of material resistant to the action of the acids, which vessel may be used as a still. The solution may be removed from the vessel and placed in a still or fractionating tower of any desired construction also made of materials resistant to the action of the acids. Preferably, the gases will be absorbed in an absorption tower of conventional structure providing for countercurrent flow of gases and liquid. In such an absorption tower, the gases will enter at one end and flow out at the opposite end after contacting scrubbing liquor flowing in the opposite direction.

When concentrated solutions are obtained from which anhydrous hydrochloric acid can be removed by simple heating, such solutions will preferably be transferred to a flash column or topping column wherein the solution is rapidly heated to the desired temperature and for the desired length of time to drive off anhydrous hydrochloric acid. The solution from such topping column is then preferably passed to a fractionating still or column wherein the solution is separated into one containing a relatively small proportion of hydrofluoric acid and a residue or bottoms containing most of the hydrofluoric acid in concentrated solution. The fraction from the fractionating column, which fraction contains the relatively small proportion of hydrofluoric acid, then may be, and is preferably, recycled to absorption tower, generally with more water, to act as the scrubbing liquor for absorbing more of the hydrochloric and hydrofluoric acids from the gases.

For the purposes of quantitatively describing the separation of hydrofluoric and hydrochloric acids, two ratios must be considered. These are the ratio of the hydrofluoric acid to the total acid in the liquid (A) and the same ratio for the vapor (B). When the fraction A/B is greater than 1, the disproportionation between the two acids in the liquid and in the vapor is such that they are at least partially separable by distillation. Thus the fraction A/B, known as the "enrichment ratio," is a measure of the separability of the two acids by distillation. For example, an enrichment ratio of 2, i. e., A/B equals 2, signifies that the relative amount of hydrofluoric acid in the vapor is ½ the relative amount in the liquid. An enrichment ratio of 200 means that, in the vapor, the proportion of hydrofluoric acid to total acid is $1/200$ of the proportion of hydrofluoric acid to total acid in the liquid. With high enrichment ratios, the vapor is essentially free of hydrofluoric acid. As the enrichment ratio decreases, relatively more hydrofluoric acid is found in the vapor.

In order to illustrate how advantage is taken of this effect to separate hydrofluoric acid and hydrochloric acid, the following examples of simple partial distillations without fractionation are given:

*Example 1*

A solution which contained 37% hydrochloric acid and 0.2% hydrofluoric acid was heated to the boiling point. The gas which was evolved contained 99.3% hydrochloric acid and 0.03% hydrofluoric acid. This corresponds to an enrichment ratio of 17.2.

*Example 2*

A solution which contained 36% hydrochloric acid and 1% hydrofluoric acid was heated to the boiling point. The effluent gas contained 99.3% hydrochloric acid and 0.09% hydrofluoric acid. This corresponds to an enrichment ratio of 30.

*Example 3*

A solution which contained 32% hydrochloric acid and 4% hydrofluoric acid was heated to the boiling point. The gas which was evolved contained 99.5% hydrochloric acid and 0.5% hydrofluoric acid. This is equivalent to an enrichment ratio of 22.

*Example 4*

A solution which contained 28% hydrochloric acid and 4.6% hydrofluoric acid was heated to the boiling point. The effluent gas contained 86% hydrochloric acid and 0.7% hydrofluoric acid. This corresponds to an enrichment ratio of 16.

The disproportionation effect, between the hydrofluoric acid in vapor in equilibrium with a liquid containing hydrochloric and hydrofluoric acids, is not limited to solutions whose concentrations are greater than those of constant boiling mixture of HCl and water. For concentrations lower than those of constant boiling mixtures, it is perfectly feasible to effect a partial separation of hydrofluoric and hydrochloric acids. For such distillations, the enrichment ratios are generally somewhat lower than in the case of high concentrations, and also anhydrous hydrochloric acid is not formed in a single simple distillation. Examples of partial distillation, without fractionation, are given below to show how separation may be effected at lower acid concentrations.

*Example 5*

A solution which contained 20% hydrochloric acid and 5% hydrofluoric acid was heated to the boiling point. The evolved gases contained 25% hydrochloric acid and 3% hydrofluoric acid. This corresponds to an enrichment ratio of 1.7.

*Example 6*

A solution which contained 18% hydrochloric acid and 8% hydrofluoric acid was heated to the boiling point. The evolved gases contained 18% hydrochloric acid and 5% hydrofluoric acid, which corresponds to an enrichment ratio of 1.4.

*Example 7*

A solution which contained 18% hydrochloric acid and 4% hydrofluoric acid was heated to the boiling point. The evolved gases contained 22% hydrochloric acid and 0.9% hydrofluoric acid. The enrichment ratio in this case was 4.6.

*Example 8*

A solution which contained 12.5% hydrochloric acid and 12% hydrofluoric acid was heated to the boiling point. The gases evolved contained 22% hydrochloric acid and 4.5% hydrofluoric acid. This corresponds to an enrichment ratio of 2.8.

By one or more redistillations of condensates, such as were obtained in Examples 5, 6, 7 and 8, hydrochloric acid substantially free from hydrofluoric acid may be obtained.

Since, as has been shown above, substantially anhydrous hydrochloric acid essentially free from hydrofluoric acid may be prepared by distillation of strong hydrochloric-hydrofluoric acid solutions and also the residues from such distillations, which contain lower concentrations of acid, may be purified, the processes for the recovery and separation of hydrochloric and hydrofluoric acids were devised. Examples are given below to illustrate how the processes operate.

*Example 9*

A substantially anhydrous gas mixture, which contained 34.5 parts of halogenated fluoro methanes, 16.5 parts of hydrochloric acid, and 0.5 part of hydrofluoric acid (a total of 51.5 parts), was passed to an absorption tower. Here it was brought in contact with 77.4 parts of a scrubber liquid which contained 21% hydrochloric acid and 0.3% hydrofluoric acid. The temperature of the absorption tower was maintained at 30° C. and the pressure between 0 and 15 lbs. gauge. The gas, which left the absorber, contained 34.5 parts of the halogenated fluoro methanes, 0.14 part of water, 0.04 part of hydrochloric acid and 0.00 part of hydrofluoric acid. The acid constituents of the inlet gas were dissolved in the scrubber liquid until 94.5 parts of solution, containing 35% hydrochloric acid and 0.7% hydrofluoric acid, were obtained. This solution was transferred to a topping column and heated to 110° C. whereupon 15.5 parts of substantially anhydrous hydrochloric acid, which contained 0.1% hydrofluoric acid, were flashed off.

From the bottom of the topping column, there were removed, at 110° C., 78.8 parts of a solution which contained 22% hydrochloric acid and 0.9% hydrofluoric acid. This solution was sent to a fractionating still, from the top of which was removed 77.4 parts of a solution containing 21% hydrochloric acid and 0.3% hydrofluoric acid. This solution, whose temperature was 106° C., was cooled and recycled to the absorption tower where it acted as the scrubbing liquid. From the bottom of the fractionating still, 7.3 parts of solution was removed, which contained 15% hydrochloric acid and 6% hydrofluoric acid.

*Example 10*

A substantially anhydrous gas mixture, which contained 34.5 parts of halogenated fluoro methanes, 16.5 parts of hydrochloric acid and 0.5 part of hydrofluoric acid (a total of 51.5 parts), was fed to an absorption tower maintained at 30° C. under a pressure of 0 to 15 lbs. gauge. Here it was brought into contact with 144 parts of a solution, containing 22% hydrochloric acid and 0.5% hydrofluoric acid. The unabsorbed gas, which left the tower, contained 34.5 parts of halogenated fluoro methanes, 0.2 part of water, 0.5 part of hydrochloric acid and no hydrofluoric acid. The acid constituents of the entering gas were dissolved in the scrubber liquid until 161 parts of a solution, containing 30% hydrochloric acid and 0.7% hydrofluoric acid, were obtained.

This solution was transferred to a topping tower where 14 parts of substantially anhydrous hydrochloric acid, containing 0.02% hydrofluoric acid, were flashed off at 35 to 40° C. From the bottom of the tower, 147 parts of solution, containing 23% hydrochloric acid and 0.8% hydrofluoric acid, were removed at 110° C. This solution was sent to a fractionating still.

The top fraction from the fractionating still consisted of 144 parts of a solution containing 22% hydrochloric acid and 0.5% hydrofluoric acid which was cooled to 30° C. and recycled to the absorption tower to be used as the scrubbing liquid.

From the bottom of the fractionating still, 16 parts of solution, containing 12.5% hydrochloric acid and 3% hydrofluoric acid, were removed.

*Example 11*

A substantially anhydrous gas mixture, which contained 20 parts of halogenated fluoro methanes, 18 parts of hydrochloric acid and 5 parts of hydrofluoric acid, was fed into an absorption tower where it was brought into intimate contact with 71.5 parts of a scrubber liquid, containing 21% hydrochloric acid and 0.5% hydrofluoric acid. The unabsorbed gas, which left the tower, contained 20 parts of halogenated fluoro methanes, 0.1 part water and 0.04 part hydrochloric acid. The acid constituents of the inlet gas were dissolved in the scrubber liquid until 94.5 parts of solution which contained 34% hydrochloric acid and 5.7% hydrofluoric acid, were obtained. This solution was then transferred to a topping column where 16 parts of substantially anhydrous hydrochloric acid was flashed off at 35 to 40° C. This gas consisted of 99% hydrochloric acid and 0.4% hydrofluoric acid.

From the bottom of the topping column, 78.5 parts of solution at 110° C., containing 21% hydrochloric acid and 7% hydrofluoric acid were removed. This solution was sent to a fractionating column and distilled. The top fraction consisted of 71.5 parts of a solution, containing 21% hydrochloric acid and 0.5% hydrofluoric acid. This was cooled from 106° C. to 30° C. and recycled to be used as the scrubbing liquid in the absorption tower. The bottom fraction from the fractionating column consisted of 27 parts of solution, containing 16.6% hydrofluoric acid and 6.7% hydrochloric acid.

It has also been found possible to prepare pure hydrochloric acid essentially free from hydrofluoric acid by distillation of solutions containing lower concentrations of acids than those of the constant boiling mixtures of hydrochloric acid and water. This is accomplished by one or more fractional distillations, as in the following example.

Example 12

One hundred parts of a solution, which contained 14% hydrochloric and 12.5% hydrofluoric acids, were fractionally distilled. The top fraction consisted of 33 parts of a solution, containing 20% hydrochloric acid and 0.3% hydrofluoric acid. The bottom fraction consisted of 93.3 parts of a solution, containing 7.8% hydrochloric acid and 13.3% hydrofluoric acid.

The top fraction was refractionated. The top fraction from this refractionation consisted of 25 parts of solution, containing 20% hydrochloric acid essentially free from hydrofluoric acid. The bottom fraction consisted of 8 parts of a solution, containing 20% hydrochloric acid and 1.2% hydrofluoric acid.

Example 13

One hundred parts per hour of a mixture of gases containing about 67 wt. percent fluoro-chloro methanes, 32 wt. percent HCl and 0.9 wt. percent HF was countercurrently contacted with 13 parts per hour of water in an efficient scrubbing tower. The vapors leaving the tower consisted of 67 parts of fluoro-chloro methanes, 28 parts of HCl, about 0.01 part of HF and a slight quantity of water. The composition of the exit gas was, therefore, about 70 wt. percent fluoro-chloro methanes, 29.5 wt. percent HCl and 0.01 wt. percent HF. The liquid removed from the bottom of the scrubber (18 lbs. per hr.) had the following approximate composition: HCl 22%, HF 5%. The temperature at the bottom of the scrubber was maintained at 90 to 100° C. and at the top at about 30° C.

The exit gas can then be contacted with fresh water to absorb hydrochloric acid therefrom and obtain a substantially pure solution of hydrochloric acid. Such solution can be further purified by further fractionation. The solution from the scrubbing tower may also be further fractionated, as in Examples 9 to 12, to further separate the hydrochloric acid and the hydrofluoric acid.

Example 14

The process of this example is shown in Figure 1 of the accompanying drawings which illustrates one commercial embodiment of our invention. Gases, comprising 66.9% by weight of halogenated hydrocarbons, 32.2% by weight of hydrochloric acid and .9% by weight of hydrofluoric acid, at a pressure of about 0 to about 15 pounds gauge, were introduced near the bottom of an absorption tower of conventional construction, indicated on the drawings as the primary absorber, at the rate of about 1,033 pounds per hour. A weak scrubbing liquor, comprising an aqueous solution having a concentration of about 21% of hydrochloric acid and 0.2% of hydrofluoric acid and at a temperature of about 30° C., was introduced into the top of the absorption tower at the rate of about 1,550 pounds per hour. The gases, leaving the primary absorber, were substantially stripped of the acids and amounted to about 695 pounds per hour of substantially 99.5% by weight of halogenated hydrocarbons and 0.1% by weight of hydrochloric acid. The liquor, from the primary absorber, passed through an organic trap for separation of any entrained halogenated hydrocarbons. The solution leaving the primary absorber amounted to about 1,890 pounds per hour and had a concentration of about 35% of hydrochloric acid and about 0.62% of hydrofluoric acid. This solution, designated on the drawings as strong scrubbing liquor, passed from the organic trap to a storage tank.

The strong scrubbing liquor was then passed to a hydrochloric acid flash column or topping column where it was rapidly heated to about 110° C. Anhydrous hydrochloric acid at the rate of about 313 pounds per hour, and comprising about 99% of hydrochloric acid and about 0.08% of hydrofluoric acid was driven off at about 35° C. The remaining liquor, indicated on the drawings as flash column bottoms, amounted to about 1,560 pounds per hour and had a concentration of about 22% of hydrochloric acid and about 0.73% of hydrofluoric acid. These flash column bottoms had a temperature of about 110° C., and were first passed to a storage tank and then to a scrubbing liquor purification column or fractionating tower. In such purification column, the solution was fractionated to give a top fraction of weak scrubbing liquor, having a temperature of about 110° C., at the rate of about 1,500 pounds per hour and having a concentration of about 21 to 22% of hydrochloric acid and about 0.2% of hydrofluoric acid. The bottom fraction, or bottoms, amounted to about 63 pounds per hour and had a concentration of about 13.6% of hydrochloric acid and about 13.2% of hydrofluoric acid.

The weak scrubbing liquor was passed through a cooling device of conventional construction where it was cooled to about 30° C. and then passes through a cleanup scrubber, wherein it is liquor, together with about 40 pounds per hour of added water, was then recycled through the primary absorber.

Example 15

The process of this example is shown in Figure 2 of the accompanying drawings and represents a further embodiment of a commercial operation in accordance with our invention. Also, this process represents a modification of the process of Example 14. In accordance with Figure 2, the same gases and scrubbing liquor are contacted in substantially the same proportions in the primary absorber to obtain substantially the same effluent gases and substantially the same amount of strong scrubbing liquor as in Figure 1 and Example 14. The strong scrubbing liquor is passed to the hydrochloric acid flash column, or topping column, and treated therein in substantially the same manner. The process of Figure 1 and Example 14 is modified, however, in that the hydrofluoric gas from the flash, or topping, column passed to a storage tank. This weak scrubbing contacted with a cleanup scrubber liquor at the rate of about 131 pounds per hour of liquor for about 313 pounds per hour of hydrochloric acid. The cleanup scrubber liquor has a concentration of about 12% of hydrochloric acid and about 0.12% of hydrofluoric acid and is preferably obtained by diluting about 75 pounds of weak scrubbing liquor with about 56 pounds of water.

The cleanup scrubber is preferably operated at about 30° C. and at a pressure of about 0 to about 15 pounds gauge. The gases from the flash column are further purified by contact with the cleanup scrubber liquor so that the gases leaving the cleanup scrubber comprise about 313 pounds per hour of 99% hydrochloric acid containing about 0.02% of hydrofluoric acid. The scrubbing liquor, in passing through the cleanup scrubber in contact with the hydrochloric acid gases, becomes more concentrated, so that, as it leaves the cleanup scrubber, it has a composition of about 35% hydrochloric acid and about 0.35% of hydrofluoric acid. The cleanup scrubber liquor, after passing through the cleanup scrubber, passes to the hydrochloric acid flash, or topping column where some of the hydrochloric acid contained therein may be flashed off.

The amount of liquor leaving the cleanup scrubber and passing to the flash column will be about 177 pounds per hour. The flash column bottoms leaving the flash, or topping, column will be correspondingly larger in amount and will be further treated in the same manner as in Figure 1 and Example 14; that is, the flash column bottoms will be passed to storage, then refractionated, the top fraction being passed to a cooler and then to a weak scrubbing liquor storage, from which it may be recycled through the process.

The processes of Examples 14 and 15 may be further modified by fractionally absorbing hydrofluoric acid from the gases in accordance with Example 13, prior to passing the gases to the primary absorber. Also, any excess of the weak scrubbing liquor produced over that required in the cyclic process and the bottoms from the fractionating, or purification, column may be further refractionated as desired, in accordance with the processes disclosed in Examples 9 to 12, inclusive.

From the above examples, it will be apparent that our process comprises the separation of mixtures of hydrochloric and hydrofluoric acids, and particularly gaseous mixtures thereof containing gaseous organic compounds, by absorption of the acids in water, production of a substantially anhydrous hydrochloric acid essentially free of hydrofluoric acid by heating the water solutions obtained, and then fractionating the residue to produce an acid suitable for recycling to the absorption step. A residue containing almost all of the hydrofluoric acid, together with a small portion of the hydrochloric acid, is obtained as a dilute mixed acid which can be further separated.

The process may be modified in many respects. Particularly, the temperatures and pressures may be widely varied. For example, the absorption tower may be operated at atmospheric, subatmospheric or superatmospheric pressures. The use of atmospheric pressures, generally from about 0 to about 15 pounds gauge, will usually be most convenient. If superatmospheric pressures are employed in the absorption tower, larger amounts of the acids can be dissolved in the scrubbing liquor to produce solutions having materially higher concentrations, whereby larger proportions of the hydrochloric acid can be obtained as anhydrous acid in each cycle. Also, the use of superatmospheric pressures permits the absorption to take place at higher temperatures, such as, for example, as high as 60° C., without excessive loss of acid with the gases leaving the absorber. Also, the use of higher temperatures and pressures reduces to a considerable extent the cost of removing the heat of absorption. On the other hand, the use of subatmospheric pressures may frequently be desirable to avoid undue absorption of the other constituents of the gases, such as halogenated hydrocarbons and the like.

The acid absorption tower may also be operated at temperatures below atmospheric, and even below 0° C. The use of such low temperatures will give increased acid strength of the solution leaving the tower, together with a greatly decreased amount of acid in the gases leaving the tower, due to the increased solubility of hydrochloric and hydrofluoric acids in water at such low temperatures. Thus, operation of the absorption tower at low temperatures will affect a more complete separation of the acids from the other constituents of the gases.

The topping column, employed for flashing off the substantially anhydrous hydrochloric acid, may be operated at either atmospheric pressure, subatmospheric pressures or superatmospheric pressures. It will generally be more convenient to operate the topping column at substantially atmospheric pressures, that is, at about 0 to about 15 pounds gauge. However, if subatmospheric pressures are employed, the flashing off of the substantially anhydrous hydrochloric acid will be correspondingly facilitated, thereby increasing the capacity of the column. On the other hand, if superatmospheric pressures are employed in the topping column, there will be produced a more pure hydrochloric acid, due to the lower volatility of the water and the hydrofluoric acid at such higher pressures.

The substantially anhydrous hydrochloric acid leaving the top of the flash, or topping, column is most conveniently maintained at approximately atmospheric temperatures. However, if desired, such substantially anhydrous hydrochloric acid may be severely chilled as it leaves the column whereby a large portion of the water in the gases may be condensed as a strong hydrochloric acid solution which further scrubs the anhydrous hydrochloric acid as it rises in the cooling device or condenser, removing further amounts of hydrofluoric acid from the hydrochloric acid gas and producing a more pure hydrochloric acid. This is due to the great solubility of hydrofluoric acid in strong hydrochloric acid solutions.

The fractionating, or purification, column most conveniently will be operated at approximately atmospheric pressures, that is, at about 0 to about 15 pounds gauge. However, if desired, superatmospheric pressures may be employed which will produce larger amounts of acid suitable for use as the scrubbing liquor in the absorption tower due to increased disproportionation of the hydrofluoric acid in the liquid to that in the vapor at such higher pressures. Such higher pressures will produce a bottom fraction more concentrated in hydrofluoric acid, which more concentrated acid may be more desirable for certain uses.

Since hydrochloric acid and hydrofluoric acid are introduced into the system in the continuous process and water, in addition to the two acids, leaves the system, water must be added to replace that leaving the system. In order to accomplish this most efficiently, it will frequently be desirable to add, in the water to be added, a portion of the essentially anhydrous hydrochloric acid leaving the topping column until a solution containing about 35% of hydrochloric acid is obtained. This strong acid solution may then be used to scrub the anhydrous hydrochloric acid leaving the topping column to obtain a further purification of the anhydrous hydrochloric acid.

All of the apparatus employed in our process may be of any conventional construction of which many varieties are well known. It is only essential that the apparatus employed be constructed of materials which will resist the corrosive action of the materials being handled.

It will thus be apparent that, by our invention, we have provided an easily operable method for economically and efficiently separating mixtures of hydrochloric and hydrofluoric acids. We may obtain either, or both, essentially pure anhydrous hydrochloric acid or essentially pure hydrochloric acid solutions of standard commercial grade. We have thus converted a substantially useless waste product to products of recognized commercial value and utility.

While we have disclosed the preferred embodiment of our invention and the preferred modes of carrying the same into effect, it will be understood that they are given for illustrative purposes only. Many modifications and variations may be made therein, and will be apparent to those skilled in the art, without departing from the spirit of our invention. Accordingly, the scope of our invention is not to be limited to the specific embodiments disclosed but we intend to cover our invention generically as in the appended claims.

We claim:

1. In the method of separating hydrochloric acid from a gaseous mixture comprising hydrochloric acid and a smaller proportion of hydrofluoric acid, the steps which comprise absorbing the acids in an inert aqueous solvent containing about 20% hydrochloric acid until the concentration of hydrochloric acid in solution has been increased to at least 25%, and then heating the solution to at least 35° C. to recover hydrochloric acid substantially free of hydrofluoric acid.

2. In the method of separating hydrochloric acid from a gaseous mixture comprising hydrochloric acid and a smaller proportion of hydrofluoric acid, the steps which comprise absorbing the acids in an inert aqueous solvent containing about 20% hydrochloric acid until the concentration of hydrochloric acid in solution has been increased to at least 25%, heating the resulting solution to about 35 to about 40° C. to recover hydrochloric acid substantially free of hydrofluoric acid, then fractionally distilling the remaining solution.

3. In the method of separating hydrochloric acid from a gaseous mixture comprising hydrochloric acid and a smaller proportion of hydrofluoric acid, the steps which comprise absorbing the acids in an inert aqueous solvent containing about 20% hydrochloric acid until the concentration of hydrochloric acid in solution has been increased to at least 25%, heating the resulting solution to about 35 to about 40° C. to recover hydrochloric acid substantially free of hydrofluoric acid, then fractionally distilling the remaining solution to obtain a distillate having substantially the same composition as the inert aqueous solvent, and recycling said distillate to absorb fresh portions of the gaseous mixture.

4. In the method of separating hydrochloric acid from a gaseous mixture comprising hydrochloric acid and hydrofluoric acid, the step which comprises absorbing at least part of the hydrofluoric acid in an aqueous solvent, insufficient in amount to absorb all of the hydrochloric acid in the gaseous mixture, to obtain a gaseous mixture poorer in hydrofluoric acid and a solution richer in hydrofluoric acid than the original gaseous mixture, and separating the resulting gaseous mixture from the resulting solution.

5. In the method of separating hydrochloric acid from a gaseous mixture comprising hydrochloric acid and hydrofluoric acid, the steps which comprise absorbing at least part of the hydrofluoric acid in an aqueous solvent, insufficient in amount to absorb all of the hydrochloric acid in the gaseous mixture, to obtain a gaseous mixture poorer in hydrofluoric acid and a solution richer in hydrofluoric acid than the original gaseous mixture, separating the resulting gaseous mixture from the resulting solution, and fractionally distilling the resulting solution.

6. In the method of separating hydrochloric acid from a gaseous mixture comprising hydrochloric acid and hydrofluoric acid, the steps which comprise absorbing at least part of the hydrofluoric acid in an aqueous solvent, insufficient in amount to absorb all of the hydrochloric acid, then absorbing the remaining gaseous hydrochloric acid and any remaining gaseous hydrofluoric acid in a separate aqueous solvent, and then fractionally distilling at least one of the resulting solutions.

7. In the method of separating hydrochloric acid from a gaseous mixture comprising hydrochloric acid and hydrofluoric acid, the steps which comprise passing the gaseous mixture in intimate contact with and countercurrent to an inert aqueous solvent so that the gaseous mixture first contacts with an aqueous solvent substantially saturated with hydrochloric acid and then with separate progressively weaker solutions of hydrochloric acid whereby most of the hydrofluoric acid is absorbed in the strong solution and the rest of the hydrofluoric acid and most of the hydrochloric acid is absorbed in the weaker solutions.

8. In the method of separating hydrochloric acid from a gaseous mixture comprising hydrochloric acid and hydrofluoric acid, the steps which comprise passing the gaseous mixture in intimate contact with and countercurrent to an inert aqueous solvent so that the gaseous mixture first contacts with an aqueous solvent substantially saturated with hydrochloric acid and then with separate progressively weaker solutions of hydrochloric acid whereby most of the hydrofluoric acid is absorbed in the first solution and the rest of the hydrofluoric acid and most of the hydrochloric acid is absorbed in the weaker solutions, and fractionally distilling at least one of the solutions so produced.

9. In the method of separating hydrochloric acid from a mixture comprising hydrochloric acid and hydrofluoric acid, the steps which comprise distilling off substantially anhydrous hydrochloric acid containing a small amount of hydrofluoric acid from an aqueous solution of the mixture, which solution contains hydrochloric acid in sufficient concentration that substantially anhydrous hydrochloric acid can be distilled therefrom, and then absorbing the hydrofluoric acid from the substantially anhydrous mixture in an inert aqueous solvent which is substantially saturated with hydrochloric acid, but not substantially saturated with hydrofluoric acid.

10. In the method of separating hydrochloric and hydrofluoric acids from a gaseous mixture comprising hydrochloric acid and hydrofluoric acid, the steps which comprise passing the gaseous mixture in intimate contact with and countercurrent to an inert aqueous solvent so that the gaseous mixture first contacts with an aqueous solution substantially saturated with hydrochloric acid but not substantially saturated with hydrofluoric acid, and then with separate aqueous solutions of hydrochloric acid containing progressively smaller amounts of hydrofluoric acid whereby most of the gaseous hydrofluoric acid is absorbed in the first mentioned solution and the rest of the hydrofluoric acid is absorbed in the later solutions.

ANTHONY F. BENNING.
FREDERICK B. DOWNING.
ROY J. PLUNKETT.

CERTIFICATE OF CORRECTION.

Patent No. 2,345,696.    April 4, 1944.

ANTHONY F. BENNING, ET AL.

It is hereby certified that error appears in the printed specification of the above numbered patent requiring correction as follows: Page 4, second column, line 61, for "passes through a cleanup scrubber, wherein it is" read --passed to a storage tank. This weak scrubbing--; page 6, second column, line 57, for "strong" read --first--; and that the said Letters Patent should be read with this correction therein that the same may conform to the record of the case in the Patent Office.

Signed and sealed this 30th day of May, A. D. 1944.

Leslie Frazer (Seal)    Acting Commissioner of Patents.